Patented Mar. 4, 1952

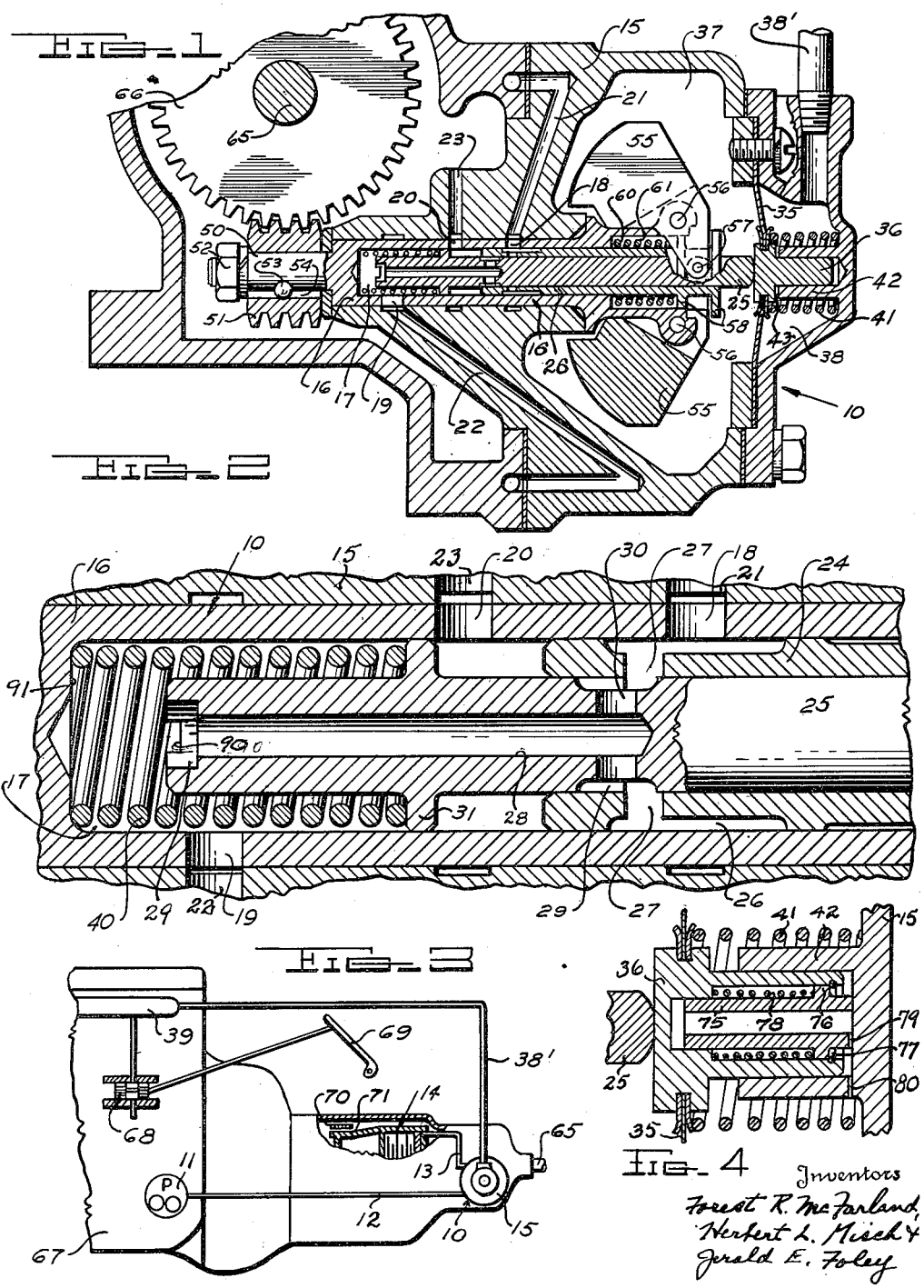

2,588,140

UNITED STATES PATENT OFFICE 2,588,140

FLUID CONTROL DEVICE

Forest R. McFarland, Huntington Woods, Herbert L. Misch, Ferndale, and Jerald E. Foley, Detroit, Mich., assignors to Packard Motor Car Company, Detroit, Mich., a corporation of Michigan Application February 1, 1946, Serial No. 644,850

11 Claims. (Cl. 74—472)

This invention relates to fluid control devices and more particularly to valve devices operated in response to a plurality of governing means.

In some forms of flow control devices, it is desirable to regulate valve operation by two interrelated governing factors such as speed and pressure. As an example, such devices are useful in controlling fluid pressure systems for applying friction devices in motor vehicle transmissions to automatically change the gear ratio and thereby obtain the best mechanical advantage for varying operating conditions. The speed factor is obtained by a governor usually operated in accordance with vehicle speed, while the force factor is often obtained by the pressure in the engine intake manifold because it is directly proportional to the throttle valve opening thereby allowing the vehicle driver to be in control. In such known control devices, the manifold pressure has directly modified the normal action of the speed governor in controlling opening and closing movement of the valve so that the speed range in which the gear ratio can thus be changed has been limited. Furthermore, with such control devices it is possible to shift back and forth between two gear ratios in such limited speed range upon normal driving operation of the accelerator pedal and this condition is undesirable.

An object of the invention is to provide a control device in which two governing means are related to effect a change in the gear ratio of a transmission to reduce torque multiplication over a wide vehicle speed range as dictated by the vehicle driver through manipulation of the accelerator pedal.

Another object of the invention is to provide a control device in which two governing means of the character referred to are related to effect change of the gear ratio of a transmission to reduce torque multiplication anywhere in a predetermined vehicle speed range as determined by the accelerator pedal position and which will sustain such gear ratio regardless of manipulation of the pedal until the vehicle speed falls below the lowest speed in the predetermined vehicle speed range.

A further object of the invention is to provide a flow control device in which correlative valve members having interdependent passage means are actuated respectively by speed sensitive means and the pressure sensitive means.

Other objects of the invention will appear from the following description taken in connection with the drawing, which forms a part of this specification, and in which:

Fig. 1 is a sectional view of the control device incorporating the invention;

Fig. 2 is an enlarged view of the control device shown in Fig. 1 but with the valve members in a different relation;

Fig. 3 is an elevational view of an engine and transmission with the fluid system and control device associated therewith; and Fig. 4 is a sectional view of a modified form of pilot and control means for the pressure responsive wall means.

Referring now to the drawings, a control device incorporating the invention is indicated generally by numeral 10. The device controls fluid flow through a pressure system comprising pump 11 and conduits 12 and 13 leading to a device 14 to be controlled.

The device 10 consists of a sectional casing 15 carrying valve housing means 16 that may be a member having preferably a cylindrical valve chamber 17. Such housing member is formed with a fluid inlet port 18, a fluid outlet port 19 and a vent 20. Passage 21 in casing 15 leads from the conduit 12 to inlet port 18, passage 22 in casing 15 leads from outlet port 19 to conduit 13 and passage 23 connects vent 20 with atmosphere.

A pair of correlative nested valve members 24 and 25 project into the chamber in the housing means 16 and such members are preferably of cylindrical form with the outer sleeve member 24 telescoping the inner solid member 25. The valve members have interdependent passage means therein. The passage means in the outer sleeve member consists of a relatively long annular exterior recess 26 and circularly extending slots or ports 27 while the passage means in the inner member consists of an axially extending end passage 28, an exterior annular recess 29 and radial ports 30 connecting passage 28 and recess 29.

Valve member 24 has a sliding fit in housing member 16 and valve member 25 has a sliding fit in valve member 24. Flange 31 projects from the inner valve member and has a sliding fit with the inner wall surface of chamber 17, such flange being disposed so that its range of movement is intermediate vent 20 and outlet port 19.

Valve member 24 is arranged to be actuated by speed sensitive means while valve member 25 is arranged to be actuated by pressure sensitive means. The outer valve member passage means is always open to inlet port 18 while the inner valve member passage means is always open to outlet port 19 so that fluid flow through the control device will be established whenever the passage means in the valve members register. The end of the inner valve member, outside of housing 16, is adjacent pressure responsive wall means consisting of diaphragm 35 and pilot 36. Casing 15 is divided into chambers 37 and 38 by the pressure responsive means and chamber 38 is connected by conduit 38' with a variable pressure source 39. Follower spring 40 in chamber 16 exerts sufficient pressure against flange 31 to hold the inner valve member against the pressure responsive wall means, and spring 41 in chamber 38 exerts an opposite pressure against the wall means sufficient to leave a gap 43 between the head of pilot 36 and stop means, in the form of a hollow abutment flange 42 in which the pilot shank is slidably mounted, under the lowest pressure condition existing in chamber 38.

The housing member 16 may be a part of the speed sensitive means for reciprocating the outer valve member and in such case its shank 50 carries gear 51 held thereon by nut 52 and in driving relation therewith by ball 53 seated in a recess therein and extending into slot 54 in the gear. This gear 51 rotates member 16 and flyweights 55 are connected thereto in chamber 37 by pins 56. The weights are provided with fingers 57 engaging between flanges 58 on member 24 and pivotal movement of the weights cause the fingers to reciprocate the outer valve member. Outward movement of the weights is opposed by spring 60 housed in recess 61 in member 16 and engaging such member at one end and flange 58 at the other end. Centrifugal force and spring 60 determine the extent of reciprocal movement of valve member 24.

This control device is particularly adapted for use with a gear ratio selector in a motor vehicle transmission as the engine intake manifold may be the source 39 of sub-atmospheric pressure and the driven shaft 65 may be used to drive gear 66 meshing with gear 51. The device 14 to be controlled may be a clutch for locking up a planetary gearing, of the type shown in Patent No. 2,373,234 to W. A. Duffield, to rotate as a unit in transmitting power from engine 67 to the driven shaft. Brake 70 holds the planetary carrier 71 stationary when the clutch is released to obtain a higher torque multiplying gear ratio. The engine throttle valve 68 in the fuel intake system is controlled by accelerator pedal 69.

The pressure responsive wall means is exposed to sub-atmospheric pressure in chamber 38 and to atmospheric pressure in chamber 37 and as follower spring 40 holds valve member 25 against the wall means, they will shift axially together as the pressure in chamber 38 varies. Pressure in the intake manifold is directly proportional to throttle valve opening, so lowest pressure occurs with the accelerator pedal lifted to idling position and highest pressure occurs when the pedal is depressed to full throttle opening. The inner valve member is responsive to such pressure conditions and the outer valve member is responsive to vehicle speed.

In Fig. 1 the control device is shown with its elements in their positions when the vehicle is standing still with the engine idling. Lowest sub-atmospheric pressure will exist in the intake manifold and chamber 38 thereby moving the diaphragm wall means almost to its extreme distended position and allowing spring 40 to move valve member 25 therewith. As the vehicle is standing still, the weights 55 are at rest and carry valve member 24 to its extreme projected relation from housing member 16. In this relation, the passage means in the valve members are out of registration so fluid flow therebetween is shut off. The inner end of valve 24 will uncover recess 29 so the passage means in valve member 25 will be open to vent 20. Fluid flow to clutch device 14 will thus be cut off and the clutch device will be disengaged. Brake 10 is also preferably disengaged while the engine is idling and standing still but is engaged as soon as the accelerator pedal is depressed.

When the vehicle is moving, the weights swing outwardly forcing valve member 24 inwardly of member 16 to an extent dictated by centrifugal force opposed by spring 60. The passage means in the valve members are arranged relatively so that a predetermined vehicle speed, say 15 miles per hour, must be reached before they register to allow fluid flow to the clutch device. The valve member 25 moves axially in response to intake manifold pressure or directly to throttle valve position so in any vehicle speed range, say from 15 to 50 miles per hour, this valve member may be moved to allow fluid flow. Thus the valve members operate independently and the registration of their passage means may be made at the will of the vehicle driver through manipulation of the accelerator pedal anywhere in the speed range to engage the clutch device for changing to a lower torque multiplying condition in the transmission. At such time valve member 24 will shut off communication between vent 20 and the passage means in valve member 25, see Fig. 2. Slots 90 in the inner end of valve member 25 allow fluid flow between passage 28 and port 19 when the valve is moved to abut wall surface 91 of the housing means in response to pressure rise.

After the vent is closed and passage means in the valve members are interrelated, fluid pressure will build up in chamber 17 and will act against flange 31 to project valve member 25 outwardly of valve member 24 until stopped by the head of pilot 36 seating against abutment member 42. Thus ports 30 and 27 are placed out of register and pressure fluid is trapped in passage 22 and conduit 13 to thereby hold the clutch device engaged until valve 24 is moved by reduced centrifugal force to open vent 20 to the passage means in valve member 25. Because fluid pressure in chamber 17 acts to distend the diaphragm to a greater extent than is possible with lowest pressure, the vehicle speed at which venting occurs to relieve pressure from the clutch device is lower than the minimum vehicle speed at which the clutch device can be engaged. Thus when fluid is admitted to the clutch device it will be trapped, regardless of change in vacuum, until the vehicle speed falls below that at which the clutch device can engage. The transmission when conditioned by the clutch device for a certain gear ratio drive will be locked in such ratio within the predetermined speed range allowing the accelerator pedal to be manipulated for driving without danger of shift back to another gear ratio.

The flexibility of diaphragm 35 plus the pressure of spring 41 determines the length of the gap 43 between the pilot head and the abutment means under low pressure in chamber 38. In order to obtain a predetermined gap length it is necessary that the diaphragm 35 should at all times be taut and this is sometimes difficult to maintain. In Fig. 4 we have shown a modified structure whereby the pilot will be maintained a predetermined distance from the abutment means without resorting to tautness of the diaphragm 35, except of course when fluid pressure is present in the valve device.

In this modified form of pilot and control for the pressure responsive wall means, the shank of pilot 36 is formed as a cylinder and a spacer member 75 is axially movable therein to a limited extent. The spacer member is in the form of a sleeve having a flange 76 engaging the interior wall surface of the pilot shank. A snap ring 77 is fixed in the pilot shank for limiting the distance the abutment engaging end of the spacer member may be projected from the pilot by coil spring 78. The coil spring is strong enough to maintain the spacer member in its extreme projected position at all times except when there is fluid pressure in the valve device. Thus the projection of the spacer member from the pilot shank will be constant without resorting to tautness of the diaphragm. Under extremely low pressure conditions in chamber 38 the spacer member will seat against casing 15 and when there is a pressure rise in the chamber the spacer will move away from the abutment wall of the casing in projected relation with the pilot and will remain in such relation until fluid pressure acts through valve member 25 to again seat the spacer and continue movement of the pilot until it is also seated against the casing wall. This seating of the pilot has the same effect of causing a lag below the governed speed in returning to geared drive from high speed drive, as previously described, and the lag will always be positive. In order to prevent pressure reaction in this control structure vent 79 is provided in the spacer member and vent 80 is provided in flange 42, the vents being in communicating relation.

It will be understood that various forms of the invention other than that described above may be used without departing from the spirit or scope of the invention.

What we claim is:

1. A device for controlling flow in a pressure fluid system comprising housing means having a fluid inlet, a fluid outlet and a vent, a pair of relatively shiftable nested valve members in the housing means, each of said valve members having passage means, the passage means in the inner valve being always open at one end to the fluid outlet and at the other end being at times in communication with the vent, the passage means in the outer valve being always open to the fluid inlet and in one range of positions being aligned only with the said other end of the inner valve member passage so as to admit fluid under pressure through the inner valve to the outlet passage, said outer valve being adapted to close the said other end to the vent when the passage in the outer valve is aligned with the other end of the inner valve passage, speed sensitive means for shifting the outer valve member, and variable fluid pressure responsive means for shifting the inner valve member.

2. A device for controlling flow in a pressure fluid system comprising a rotatable housing member having an interior chamber, a fluid inlet, a fluid outlet and a vent, said inlet, outlet and vent being in communication with the chamber, a pair of relatively shiftable nested valve members in the chamber, each of said valve members having passage means, the passage means in the inner valve being always open at one end to the fluid outlet and at the other end being at times in communication with the vent, the passage means in the outer valve being always open to the fluid inlet and in one range of positions being aligned only with the said other end of the inner valve member passage so as to admit fluid under pressure through the inner valve to the outlet passage, said outer valve being adapted to close the said other end to the vent when the passage in the outer valve is aligned with the other end of the inner valve, flyweights on the housing member connected to actuate one of the valve members, and means sensitive to variable fluid pressure for actuating the other valve member.

3. A device as described in claim 2, the outer valve member being formed with a peripheral groove at one end thereof, and means on the flyweights extending into the groove, thereby positioning the outer valve member relative to the rotatable housing member in accordance with the position of the flyweights.

4. A device for controlling flow in a pressure fluid system comprising a housing member having a fluid inlet and a fluid outlet, a pair of relatively shiftable nested valve members within the housing member, each of said valve members having passage means, the passage means in the inner valve being always open at one end to the fluid outlet and the other end being controlled by the outer valve member, and the passage means in the outer valve member being always open to the fluid inlet and adapted to be aligned with the said other end of the inner member to admit fluid under pressure to the passage in the inner valve member, speed sensitive means for shifting the outer valve member, wall means movable in response to fluid pressure acting as one side thereof, said wall means being disposed adjacent one end of the inner valve member to exert a variable force on said inner valve member to effect shift of said inner valve member, and a follower spring in the housing means holding the inner valve member against the wall means.

5. A device as described in claim 4, and means for rotating the housing, said speed sensitive means comprising flyweights rotatable with the housing, and means connecting the flyweights with the outer valve member whereby to shift the outer valve member relative to the housing and relative to the inner valve member to control the flow of fluid under pressure to the inner valve member.

6. A device as described in claim 4, said movable wall means comprising a diaphragm, an abutment and a spring acting upon the diaphragm in opposition to the follower spring and reacting against the abutment, and said pressure means comprising a source of vacuum communicating with the face of the diaphragm wall means opposite the inner valve member.

7. A device as described in claim 4, means for rotating the housing, said speed sensitive means comprising flyweights and means for driving the flyweights from the housing.

8. In combination, a vehicle having an internal combustion engine, a fuel intake manifold for the engine, a variable speed ratio gear transmission for transmitting the power from the engine to a load, a gear ratio selector for the transmission, and control means for the gear ratio selector, said control means comprising a pressure fluid system for actuating the selector, a housing in the system forming a valve chamber and having an inlet port, an outlet port and a vent, a pair of relatively shiftable nested valve members in the chamber, each of said valve members having passage means, the passage means in the inner valve being always open at one end to the fluid outlet and at the other end being aligned with the vent, the passage means in the outer valve being always open to the fluid inlet and having a portion which in one range of positions of the outer valve member is aligned only with the vent and in another range of positions of the outer valve member is aligned only with the said other end of the inner valve member so as to admit fluid under pressure through the inner valve to the outlet passage, means on the inner valve member responsive to fluid pressure in the passage in said inner valve member to urge the inner valve member in a direction to align the said passage in said inner valve member with the inlet port, wall means adjacent one end of the inner valve member including a diaphragm and a pilot, a follower spring in the chamber acting upon the inner valve member to hold the said inner valve member against the wall means, means establishing communication between the face of the wall means opposite the inner valve member and the engine intake manifold, means responsive to vehicle speed for shifting the outer valve member, abutment means adjacent the face of the wall means remote from the inner valve member, the force exerted by the last-mentioned spring and diaphragm being sufficient to leave a gap between the abutment means and the pilot under extreme low manifold pressure, the passage means in the valve members being aligned to connect the inlet port with the passage in the inner valve member by the combined action of the vehicle speed responsive means and intake manifold pressure, the fluid pressure in the inner valve passage means acting upon the pressure responsive means on the inner valve member to move the valve member against the wall means and the wall means against the pilot to seat the latter against the abutment means, whereby the passage means in the inner valve member cannot be opened under any manifold pressure conditions until the outer valve member is moved by a reduction in vehicle speed.

9. The combination as described in claim 8, a spacer member slidable a limited extent in the pilot, and a spring projecting the spacer from the pilot, the force exerted by the last-mentioned spring being sufficient to maintain the spacer in maximum projected relation from the pilot under all pressure conditions in the chamber.

10. A device for controlling flow in a pressure fluid system as described in claim 1, and means responsive to fluid under pressure in the inner valve passage to hold the inner valve member in a predetermined position corresponding to a shift of said inner valve member by the variable pressure means, thereby preventing the operation of the said variable pressure means.

11. A device for controlling flow in a pressure fluid system as described in claim 1, and means responsive to fluid under pressure in the inner valve passage to hold the inner valve member in a predetermined position corresponding to a shift of said inner valve member by the variable pressure means, thereby preventing the operation of the said variable pressure means, said means responsive to fluid under pressure comprising a piston flange on the inner valve member exposed on one side to the fluid in the passage in the inner valve and exposed on the other to the vent.

FOREST R. McFARLAND.
HERBERT L. MISCH.
JERALD E. FOLEY.

REFERENCES CITED

The following references are of record in the file of this patent:

UNITED STATES PATENTS

| Number | Name | Date |
|---|---|---|
| 459,545 | Freeman | Sept. 15, 1891 |
| 991,950 | Carroll | May 9, 1911 |
| 1,125,825 | Englesson | Jan. 19, 1915 |

FOREIGN PATENTS

| Number | Country | Date |
|---|---|---|
| 612,163 | France | July 26, 1926 |